United States Patent [19]
// Brandt et al.

[11] Patent Number: 5,426,151
[45] Date of Patent: Jun. 20, 1995

[54] POLYSILOXANE-CONTAINING BINDERS, MANUFACTURE THEREOF, COATING AGENTS CONTAINING THEM, AND USE THEREOF

[75] Inventors: Lutz Brandt, Essen; Carmen Flosbach, Wuppertal; Reinhardt Kalus, St. Katharinen; Walter Schubert, Wuppertal, all of Germany

[73] Assignee: Herberts Gesellschaft mit beschrankter Haftung, Wuppertal, Germany

[21] Appl. No.: 153,938

[22] Filed: Nov. 17, 1993

[30] Foreign Application Priority Data

Nov. 28, 1992 [DE] Germany .................. 42 40 108.9

[51] Int. Cl.⁶ .............................................. C08F 30/08
[52] U.S. Cl. .................................... 525/100; 525/106; 525/479; 525/476; 525/474; 525/452; 525/903; 524/866
[58] Field of Search ............... 525/106, 479, 476, 474, 525/452, 903, 100; 524/866

[56] References Cited

U.S. PATENT DOCUMENTS

| | | | |
|---|---|---|---|
| 4,211,729 | 7/1980 | Marquardt et al. | 525/106 |
| 4,558,082 | 12/1985 | Eckberg | 524/104 |
| 4,624,998 | 11/1986 | Keil | 525/476 |
| 5,077,354 | 12/1991 | Woo et al. | 528/26 |

*Primary Examiner*—John C. Bleutge
*Assistant Examiner*—Margaret W. Glass
*Attorney, Agent, or Firm*—Schweitzer Cornman & Gross

[57] ABSTRACT

A polymeric coating agent which comprises a polymer of from 60 to 97 wt. % of one or more (meth)acrylic monomers the polymerization of which can be initiated by free radicals, from 3 to 40 wt. % of at least one $\alpha, \omega$-hydroxy-, carboxy-, and/or epoxy-functional polysiloxanes of the formula (I)

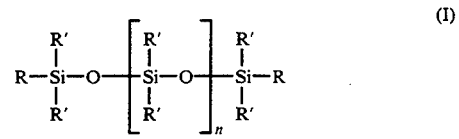

wherein R' can be the same or different and is $C_{1-6}$ alkyl, and R can be the same or different and is $-Alk-(OAlk)_p-OH;$

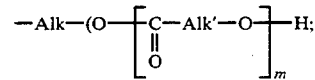

$-Alk-OH;$

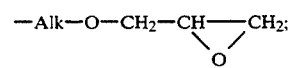

or

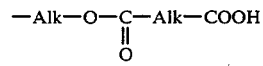

wherein Alk and Alk' are $C_{1-6}$ alkylene and the alkylene groups in a molecule can be the same or different, n is a cardinal number from 8 to 40, m is a cardinal number from 2 to 30, and p is a cardinal number from 1 to 20 of solids in the monomers.

13 Claims, No Drawings

POLYSILOXANE-CONTAINING BINDERS, MANUFACTURE THEREOF, COATING AGENTS CONTAINING THEM, AND USE THEREOF

BACKGROUND OF THE INVENTION

The invention relates to polysiloxane-containing binders suitable for preparing coating agents. Coating agents of this kind are particularly suitable for producing dirt-repellent coatings, e.g. for producing anti-graffiti coatings.

In recent years, the public has repeatedly been confronted with the problem of undesired graffiti produced by spraying and frequently disfiguring public buildings and vehicles in particular. In most cases they cannot be eliminated simply by washing; usually the graffiti-bearing walls have to be repainted, which is laborious and expensive.

Attempts have been made to prepare protective coatings based on "anti-graffiti" lacquers, the lacquers comprising fluorine-containing polymers, as described e.g. in U.S. application Nos. 4,929,666 and 5,006,624. These lacquers give coatings having a low surface tension, resulting in dirt-repellent properties. For example it is known that fluorine-containing polymers, owing to their particularly low critical surface tension, are difficult to wet, not only with water but also with oils and fats (H. G. Elias, "Makromoleküle, Volume 1: Struktur, Synthese, Eigenschaften", page 805, Hüthig & Zeichen Wepf Verlag, Basle, 5th edition, 1990).

Polysiloxane compounds also reduce surface tension. DE-A-26 10 372 describes solution polymers produced in a mixture of organic solvents and alkyl hydrogen polysiloxanes. These solution polymers are used to impregnate textiles. U.S. application No. 5,077,350 describes powder lacquers containing a polymer produced by copolymerisation of (meth)acrylic monomers containing epoxy groups in the presence of silanols containing at least two SiOH groups. As a result of the high reactivity of the silanols used, copolymerisation is possible only with special monomers, since gelling occurs otherwise.

SUMMARY OF THE INVENTION

The object of the invention is to provide polymers or binders suitable for dirt-repellent coatings which are non-toxic and retain their dirt-repellent effect for a long period of e.g. several years.

It has been shown that this problem can be solved by preparing coating agents in which the binder or binder component comprises one or more reaction products obtained by polymerisation of radically polymerisable monomers in the presence of polysiloxanes containing functional groups, the polysiloxanes being free from —Si—OH and —Si—OR' (R'=alkyl).

DETAILED DESCRIPTION OF THE INVENTION

The invention therefore relates inter alia to polysiloxane-containing binders suitable for coating agents and obtainable by radically initiated polymerisation of 97 to 60 wt. % of one or more (meth)acrylic monomers and optionally also one or more different, radically polymerisable monomers, in the presence of 3 to 40 wt. % of one or more α, ω-hydroxy-, carboxy- and/or epoxy-functional polysiloxanes having the general formula (I)

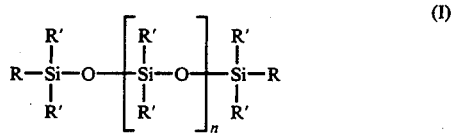

in which the radicals R' can be the same or different and denote alkyl radicals containing 1 to 6 carbon atoms and in which the radicals R can be the same or different and denote

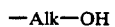

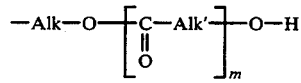

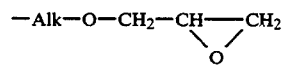

or

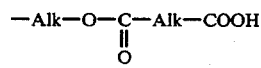

in which Alk and Alk' denote alkylene groups containing 1 to 60 carbon atoms and the alkylene groups in a molecule can be the same or different, $n=8$ to 40, $m=2$ to 30 and $p=1$ to 20, and the percentages by weight relate to the sum of the weight of solids in the monomers and polysiloxanes used.

The resulting polysiloxane-containing binders are suitable for preparing solvent-containing and/or aqueous coating agents suitable for manufacturing dirt-repellent coatings and also constituting a subject of the invention.

The coating agents according to the invention, in addition to the binders according to the invention, can contain one or more cross-linking agents, one or more organic solvents and/or water, and other conventional lacquer additives and auxiliary substances. In addition to the polysiloxane-based binders according to the invention, they can contain one or more additional film-forming binders which do not cross-link the polysiloxane-based binders according to the invention.

The polysiloxane-based binders according to the invention can be manufactured by using α, ω-functional polysiloxanes. These polysiloxanes contain hydroxy, carboxy and/or epoxy groups in the α and the ω-position. They do not contain any hydroxyl or alkoxy groups directly bonded to silicon atoms.

The polysiloxanes used according to the invention can be manufactured without difficulty. One possibility is to synthesise the corresponding alkyl halogenosilanes from SiCl₄, silicic acid tetraethyl ester or elementary Si in known manner and subsequently hydrolyse them to the corresponding silanols. The silanols can then be condensed to siloxanes by heating, optionally with addition of acid (see e.g. H. Remy, Lehrbuch der anorganischen Chemie, Volume 1, 13th edition, Akademische Verlagsgesellschaft Geest und Parzig, K. G. Leipzig, 1970). The resulting siloxanes are α, ω-hydroxyalkyl-functional. If these terminal OH groups are suitably transesterified with cyclic esters such as ε-caprolactone, these OH groups can be chain lengthened by ring-opening addition. If the OH groups are transesterified with anhydrides such as succinic acid anhydride, $\alpha, \omega$-COOH-functionalised siloxanes can be obtained, whereas $\alpha, \omega$-functionalised glycidyl siloxanes can be obtained by reacting the OH groups e.g. with epichlorohydrin.

Siloxanes of the kind used according to the invention are also described e.g. in DE-A-4 017 075. They are also commercially obtainable, e.g. as sold by Messrs Th. Goldschmid AG; EFKA Chemicals B. V.; Dow Corning Corp. Europe, Brussels; Wacker Chemie, Burghausen; or Bayer AG.

The polysiloxanes used for producing the binders according to the invention correspond to the previously-given general formula (I). In a preferred embodiment, all the radicals R' in the general formula (I) are methyl radicals. The alkylene radicals Alk and Alk' preferably contain 1 to 6 carbon atoms. The Alk radicals preferably contain 2 to 3 carbon atoms, particularly ethylene or propylene groups. The Alk' radicals more particularly contain 4 to 6 carbon atoms, preferably 5 carbon atoms.

The following are particularly preferred definitions of the radicals R, which can be the same or different:

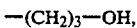

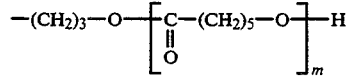

with m=2 to 30

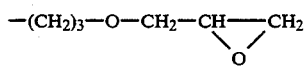

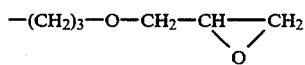

or

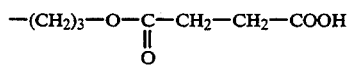

and n=8 to 40.

The polysiloxanes used for producing the binders according to the invention preferably have a number average molecular weight (Mn) of 600 to 9,000. The polymers (polysiloxane-containing binders) obtained by polymerisation of the monomers used according to the invention in the presence of polysiloxanes preferably have a number average molecular weight (Mn) of 1,000 to 20,000.

All known monofunctional (meth)acrylic monomers, optionally together with other different, radically polymerisable monomers, can be used for polymerisation in the presence of the polysiloxanes. The proportion of additional monomers can e.g. be 0 to 50% by weight, preferably 0 to 40% relative to the weight of the (meth)acrylic monomers.

The expression (meth)acrylic is here synonymous with acrylic and/or methacrylic, which can be substituted.

The following are examples of (meth) acrylic monomers: (meth)acrylic acid esters such as alkyl(meth)acrylates, which can also carry other functional groups, such as hydroxyl groups, amino groups, more particularly tert.-amino groups, glycidyl groups or carboxy-functionalised monomers.

The following are examples: long-chain, branched or unbranched unsaturated monomers such as alkyl(meth)acrylates with $C_8$–$C_{18}$ chains in the alkyl part, e.g. ethylhexyl(meth)acrylate, octyl(meth)acrylate, 3,5,5-trimethylhexyl (meth)acrylate, decyl(meth)acrylate, dodecyl(meth)acrylate, hexadecyl(meth)acrylate, octadecyl(meth)acrylate, lauryl acrylate-1214, isobornyl(meth)acrylate or 4-tert.butyl cyclohexyl methacrylate. The following are additional examples: short or medium-chain, branched or unbranched unsaturated monomers such as alkyl(meth)acrylates with $C_1$–$C_7$ chains in the alkyl part, e.g. methyl (meth) acrylate, ethyl (meth) acrylate, propyl (meth)acrylate, isopropyl(meth)acrylate, butyl(meth)acrylate, isobutyl(meth)acrylate, tert.butyl(meth)acrylate, pentyl(meth)acrylate, hexyl(meth)acrylate or cyclohexyl(meth)acrylate.

The (meth)acrylic monomers used can e.g. carry primary or secondary hydroxy groups. The following are examples of monomers with primary hydroxy groups: hydroxyalkyl esters of acrylic acid and/or methacrylic acid with a primary OH group and a $C_2$–$C_3$-hydroxyalkyl radical with hydroxyethyl-(meth)acrylate, or hydroxyalkyl esters of acrylic acid and/or methacrylic acid with a primary OH group and a $C_7$–$C_{18}$ hydroxyalkyl radical such as butanediol monoacrylate, hydroxyhexyl acrylate, hydroxyoctyl acrylate, and the corresponding methacrylates and reaction products of hydroxyethyl(meth)acrylate with caprolactone.

The following are examples of monomers with secondary OH groups:

Hydroxypropyl(meth) acrylate, adducts of glycidyl(meth)acrylate and saturated short-chain fatty acids with $C_1$–$C_3$ alkyl radicals, such as acetic acid or propionic acid, or adducts of Cardura E (glycidyl esters of versatic acid) with unsaturated COOH-functional compounds such as acrylic or methacrylic acid, maleic acid, crotonic acid, adducts of Cardura E with unsaturated anhydrides such as maleic acid anhydride, or products of a reaction between glycidyl(meth)acrylate and saturated branched or unbranched fatty acids with $C_4$–$C_{20}$ alkyl radicals such as butanoic acid, caproic acid, lauric acid, palmitic acid, stearic acid or arachidonic acid.

Acrylic acid, methacrylic acid and crotonic acid are examples of carboxy-functionalised monomers.

Alternatively, use can be made of glycidyl-functionalised monomers, e.g. glycidyl(meth)acrylate, 1,2-epoxybutyl acrylate or 2,3-epoxycyclopentyl acrylate.

(Meth)allyl glycidyl ether or 3,4-epoxy-1-vinyl cyclohexane are examples of other glycidyl monomers which can be copolymerised.

Another alternative is e.g. to use (meth)acrylic monomers with terminal tertiary amino groups. Tert.amino methyl methacrylate or tert.amino propyl methacrylate are examples of such monomers. When these monomers are used, glycidyl-functionalised monomers should not be used at the same time, since otherwise the polymers may gel.

The following are examples of radically polymerisable monomers which can be used with the (meth)acrylic monomers: vinyl aromatic monomers such as styrene and styrene derivatives such as vinyl toluenes, chlorostyrenes, o-, m-or p-methyl styrene, 2,5-dimethyl styrene, p-methoxystyrene, p-tert. butylstyrene, p-dimethyl aminostyrene, p-acetamido-styrene and m-vinylphenol. Vinyl toluenes, particularly styrene, are preferred.

Possible carboxyl-functionalised monomers can e.g. be crotonic acid, unsaturated anhydrides such as maleic acid anhydride or semi-esters of maleic acid anhydride produced by addition of saturated aliphatic alcohols such as ethanol, propanol, butanol and/or isobutanol.

The following are examples of other suitable ethylenically unsaturated monomers: the alkyl esters of maleic, fumaric, tetrahydrophthalic, crotonic, isocrotonic, vinyl acetic and itaconic acid, e.g. corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters.

Use can also be made of small proportions of monomers with at least two polymerisable olefinically unsaturated double bonds. Preferably the proportion of these monomers is below 5% by weight, relative to the total weight of the monomers.

The following are examples of such compounds: hexanediol diacrylate, hexanediol dimethacrylate, ethylene glycol diacrylate, ethylene glycol dimethacrylate, butanediol diacrylate, butanediol dimethacrylate, hexamethylene bis methacrylic amide, trimethylol propane triacrylate, trimethylol propane trimethacrylate and similar compounds.

During synthesis of the binders according to the invention, the radically polymerisable monomers are reacted in the presence of one or more polysiloxanes. If the polysiloxanes are liquids, solvents may be unnecessary. Alternatively the work can be done in the presence of solvents, resulting in a liquid reaction medium. Advantageously the amount of solvent is kept at a minimum. The solvents can e.g. be conventional lacquer solvents such as aromatic hydrocarbons or esters, e.g. xylene or butyl acetate.

The proportion of polysiloxane is chosen at 3 to 40% by weight of the total content of solids in the finished binder.

In one embodiment of the method according to the invention, the polysiloxanes can optionally be initially supplied with a small amount of solvent. Usually the total amount of polysiloxane is supplied at the beginning. In order to polymerise the monomers, this polysiloxane matrix can be heated, e.g. to temperatures of the order of 100° to 150° C., e.g. 140° C.

The monomers can then be introduced into this monomer matrix, e.g. by adding dropwise, e.g. over a period of 3 to 5 hours.

The monomers or the monomer mixture can contain initiators. If initiators are not present in the monomer mixture, they can be added to the monomer mixture, optionally after a slight delay, or separately metered. Polymerisation is then continued for a longer period, e.g. for several hours. The content of solids can then be adjusted by using a conventional lacquer solvent, e.g. about 30 to 60% by weight, e.g. 50% by weight.

The binders are prepared by radical copolymerisation. The proportion of monomers is adjusted to obtain the desired specifications regarding molecular weight, proportion of OH groups, OH number and acid number.

The manufacturing process is preferably in the form of radical solution polymerisation in the presence of a radical initiator as known to the skilled man. The following are examples of radical initiators: dialkyl peroxides such as di-tert.butyl peroxide, di-cumyl peroxide; diacyl peroxide, e.g. di-benzoyl peroxide or dilauroyl peroxide; hydroperoxides such as cumene hydroperoxide or tert.butyl hydroperoxide; peresters such as tert.butyl perbenzonate, tert.butyl perpivalate, tert.butyl per-3,5,5-trimethyl hexanoate or tert.butyl-per-2-ethyl hexanoate; peroxide dicarbonates such as di-2-ethyl hexyl peroxydicarbonate or dicyclohexyl peroxydicarbonate; perketals such as 1,1-bis-(tert.butylperoxy)-3,5,5-trimethyl cyclohexane or 1,1-bis-(tert.butylperoxy)-cyclohexane; ketone peroxides such as cyclohexanone peroxide, methyl isobutyl ketone peroxide and azo compounds such as 2,2'-azo-bis-(2,4-dimethyl valeronitrile), 2,2'-azo-bis-(2-methyl butyronitrile), 1,1'-azo-bis-cyclohexane carbonitrile, azo-bis-isobutyronitrile, or C-C-cleaving initiators such as benzopinacol derivatives.

The polymerisation initiators are usually added in a proportion of 0.1 to 4% by weight relative to the amount of monomers.

If an aqueous emulsion needs to be produced, the solvent used in manufacture is removed, instead of adjusting the content of solids by adding conventional lacquer solvents. The removal can be by distillation, optionally in vacuo. The resulting resin concentrate, which has a high content of solids, e.g. 90% by weight, can then be neutralised with a conventional base such as ammonia or an organic amine, e.g. triethylamine, if acid groupings are present in the resin. The resulting neutralised resin concentrate can be emulsified in water, e.g. with vigorous agitation and optionally with heating, e.g. to temperatures of 30° to 80° C., e.g. 50° C.

Alternatively, in the manufacture of the resins, monomers with basic groupings, e.g. containing tertiary amines, can be incorporated in the polymer. The resulting resin, which contains basic groups, can then be neutralised with acids, e.g. inorganic or organic acids such as formic acid or acetic acid, and then incorporated in the emulsion in water.

If the resin contains no acid, basic or ionic groups, it can be emulsified by using a conventional non-ionic emulsifier. This can be done e.g. by homogenising the resin concentrate and the non-ionic emulsifier, optionally with heating, e.g. to temperatures of 30° to 80° C., e.g. 60° C. A mixture of this kind can be emulsified in a conventional homogenisation device, e.g. a rotor-stator homogeniser operating at speeds of e.g. 8000 to 10,000 rpm. The emulsifiers are added e.g. in proportions of 3 to 30% by weight relative to the resin concentrate.

It is assumed that the process according to the invention results in fixing of the polysiloxane resins in the binder matrix formed by polymerisation of the monomers. Without being restricted to a special theory, it will be assumed here that on the one hand, polymerisation of monomers in the presence of the polysiloxane resin results in a semi-interpenetrating network, but on the other hand during polymerisation at least some of the monomers are grafted on to the polysiloxane matrix. It is assumed that this results in the favourable weathering resistance of coatings produced on the basis of the binders according to the invention.

The binders according to the invention are particularly suitable for producing coating agents. These coating agents can contain conventional lacquer additives, more particularly cross-linking agents, in addition to the binders according to the invention. The cross-linking agents can be chosen so that they chemically cross-link the polysiloxanes in the binder and also cross-link the other resin constituents, thus additionally binding the polysiloxanes in the coatings.

During manufacture of the binders according to the invention, the functional groups on the polysiloxanes remain largely intact. Accordingly the cross-linking agents can be chosen to match the functional groups used in the binders. The following are examples of combinations of polysiloxane-based binders and cross-linking agents:

1) Hydroxy and/or carboxy-functionalised polysiloxanes in which hydroxy and/or carboxy-functionalised (meth)acrylic monomers inter alia are incorporated in the polymer, combined with cross-linking agents based on 1a) Polyisocyanates, optionally masked, and/or 1b) Melamine resins, or 1c) Polyepoxides, optionally catalysed with acids or basic catalysts.

2) Epoxy-functionalised polysiloxanes in which epoxy- and optionally hydroxy-functionalised (meth)acrylic monomers inter alia are incorporated in the polymer, combined with cross-linking agents based on 2a) Carboxy-functionalised compounds, the cross-linking optionally being catalysed with acids or bases, and optionally 2b) Melamine resins, or 2c) Polyamines, optionally masked.

3) Epoxy-functionalised polysiloxanes in which epoxy-functionalised (meth)acrylic monomers are optionally incorporated in the polymer, after which some of the glycidyl groups are esterified with α, β-unsaturated carboxylic acids, thus incorporating unsaturated groupings in the resin as described in DE-A-40 27 259, combined with cross-linking agents based on 3a) Polyamines, optionally masked, or 3b) Components with a number of C-H-acid groupings in the molecule, optionally with addition of a basic catalyst, or 3c) Transesterification cross-linking agents with a number of transesterifiable groups per molecule.

The polyisocyanates 1a may e.g. be diisocyanates, such as conventional lacquer aliphatic, cycloaliphatic or aromatic diisocyanates, e.g. 2,4-toluylene diisocyanate; 2,6-toluylene diisocyanate; 4,4-diphenyl methane diisocyanate, hexamethylene diisocyanate; 3,5,5-trimethyl-1-isocyanate-3-isocyanatomethyl cyclohexane; m-xylylene diisocyanate, p-xylylene diisocyanate; tetramethyl diisocyanate, isophorone diisocyanate or cyclohexane-1,4-diisocyanate.

The polyisocyanate can be linked to form prepolymers having a higher molecular weight. The following are examples: adducts of toluylene diisocyanate and trimethylol propane, a biuret formed from three molecules of hexamethyl diisocyanate, or trimers of hexamethylene diisocyanate and trimers of isophorone diisocyanate.

The isocyanate groupings in the polyisocyanates used are optionally completely masked. Conventional masking agents can be used, e.g. malonic acid dimethyl ester, malonic acid diethyl ester, aceto acetic acid ester, caprolactone, 1,2-propanediol and/or butanone oxime or other masking agents well-known to the skilled man.

The melamine resins 1b can be cross-linking agents in the form of conventional resins such as methyl-etherified melamines, e.g. the following commercial products: Cymel 325, Cymel 327, Cymel 350, Cymel 370 and Maprenal MF 927.

The following are other examples of suitable melamine resins 1b: butanol or isobutanol-etherified melamines such as the following commercial products: Setamin US 138 or Maprenal MF 610; mixed etherified melamines etherified either with butanol or methanol, e.g. Cymel 254, or hexamethyl oxymethyl melamine (HMM melamines) such as Cymel 301 or Cymel 303. The latter may require an external acid catalyst such as p-toluene sulphonic acid for cross-linking.

The binders according to the invention as described in 1) can be cross-linked with non-masked polyisocyanates over a wide temperature range, e.g. between 20° C. and 180° C., the range between 20° C. and 80° C. being preferred.

In the case where masked polyisocyanates and/or melamine resins are used, the stoving temperatures are preferably between 80° C. and 180° C.

The following are examples of polyepoxides 1c which can be cross-linked with binders 1) containing acid groups, e.g. COOH groups: di- or polyfunctional epoxy compounds manufactured e.g. by using di- or polyfunctional epoxy compounds such as diglycidyl or polyglycidyl ethers of (cyclo)aliphatic or aromatic hydroxy compounds such as ethylene glycol, glycerol, 1,2- and 1,4-cyclohexanediol, bisphenols such as bisphenol A, polyglycidyl ethers of phenol formaldehyde novolaks, polymers of ethylenically unsaturated groups containing epoxy groups such as glycidyl (meth)acrylate, N-glycidyl (meth)acrylamide and/or allyl glycidyl ether, optionally copolymerised with various other ethylenically unsaturated monomers, glycidyl ethers of fatty acids with 6-24 C-atoms, epoxidised polyalkadienes such as epoxidised polybutadiene, hydantoin epoxy resins, glycidyl group-containing resins such as polyesters or polyurethanes containing one or more glycidyl groups per molecule, and mixtures of the aforementioned resins and compounds.

Optionally, cross-linking can additionally be catalysed with catalysts added e.g. in a proportion of 0.1 to 10% relative to the total content of solid resin.

The catalysts are e.g. phosphonium salts such as benzyl triphenylphonium acetate, chloride, bromide or iodide, or e.g. ammonium compounds such as tetraethyl ammonium chloride or fluoride.

Carboxy-functionalised poly(meth)acrylic copolymers and/or one or more carboxy-functionalised polyesters are examples of carboxy-functionalised compounds 2a capable of cross-linking the epoxy-functionalised binders described in 2).

In a preferred embodiment of the invention, the carboxy-functionalised poly(meth)acrylic copolymers have a number average molecular weight (Mn) of 1,000 to 10,000 g/mol. The corresponding usable carboxy-functionalised polyesters preferably have a calculated molecular weight of 500 to 2,000 g/mol. The acid number of these starting materials is about 15 to 200 mg KOH/g, preferably 30 to 140 mg KOH/g and particularly preferably 60 to 120 mg KOH/g.

During the manufacture of the carboxyl group-containing poly(meth)acrylic copolymers or polyesters, the carboxyl groups can be introduced directly by using carboxyl group-containing components, e.g. when building up polymers such as (meth)acrylic copolymers. The following are examples of carboxyl group-containing monomers suitable for this purpose: unsaturated carboxylic acids such as acrylic, methacrylic, itaconic, crotonic, isocrotonic, aconitic, maleic or fumaric acid, semi-esters of maleic and fumaric acid and β-carboxyethyl acrylate and adducts of acrylic acid and/or methacrylic acid hydroxyalkyl esters with carboxylic acid anhydrides, e.g. phthalic acid mono-2-methacryloyl oxyethyl ester.

In the preceding description and in the claims, the expression (meth)acrylic is used. This means acrylic and/or methacrylic.

Alternatively in the manufacture of the carboxyl group-containing (meth)acrylic copolymers or polyesters, a hydroxy and optionally carboxyl group-containing polymer with an OH number of 15 to 200 mg KOH/g can first be built up and some or all of the carboxyl groups can be introduced in a second stage by reacting the hydroxyl and optionally carboxyl group-containing polymers with carboxylic acid anhydrides.

The following carboxylic acid anhydrides are suitable for addition to the hydroxyl group-containing polymers: the anhydrides of aliphatic, cycloaliphatic and aromatic saturated and/or unsaturated di- and polycarboxylic acids, e.g. the anhydrides of phthalic acid, tetrahydrophthalic acid, hexahydrophthalic acid, succinic acid, maleic acid, itaconic acid, glutaric acid, trimellitic acid and pyromellitic acid, or halogenated or alkylated derivatives thereof.

It is preferable to use anhydrides of phthalic acid, tetrahydro- or hexahydrophthalic acid or 5-methyl-hexahydrophthalic acid anhydride.

The following are examples of suitable hydroxyalkyl esters of α, β-unsaturated carboxylic acids with primary hydroxyl groups for producing hydroxy-functional poly(meth) acrylates: hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Hydroxyalkyl esters with a secondary hydroxyl group can e.g. be 2-hydroxypropyl acrylate, 2-hydroxybutyl acrylate, 3-hydroxybutyl acrylate or the corresponding methacrylates.

Advantageously the hydroxyl-functionalised compounds can at least partly consist of a product of a reaction between 1 mol of hydroxyethyl acrylate and/or hydroxyethyl methacrylate and an average of 2 mols of ε-caprolactone.

The hydroxy-functionalised component can at least partly consist of a product of a reaction between acrylic acid and/or methacrylic acid and the glycidyl ester of a carboxylic acid containing a tertiary α-carbon atom. Glycidyl esters of strongly branched monocarboxylic acids are obtainable under the trade name "Cardura". The reaction between acrylic acid or methacrylic acid and the glycidyl ester of a carboxylic acid containing a tertiary α-carbon can occur before, during or after the polymerisation reaction.

During the manufacture of the (meth)acrylic copolymers, additional ethylenically unsaturated monomers can be used in addition to those previously mentioned. The choice of additional ethylenically unsaturated monomers is not critical, provided incorporation of these monomers does not give undesired properties to the copolymer.

The following are particularly suitable additional ethylenically unsaturated components: alkyl esters of acrylic and methacrylic acid, e.g. methyl(meth) acrylate, ethyl(meth)acrylate, propyl(meth)acrylate, butyl(meth)acrylate, isopropyl(meth)acrylate, isobutyl(meth)acrylate, pentyl(meth)acrylate, hexyl(meth)acrylate, cyclohexyl(meth)acrylate, 2-ethylhexyl(meth)acrylate, octyl(meth)acrylate, 3,5,5-trimethylhexyl(meth)acrylate, decyl(meth)acrylate, dodecyl(meth)acrylate, hexadecyl(meth)acrylate, octadecyl(meth)acrylate and octadecenyl(meth)acrylate.

Instead of the previously-mentioned alkyl esters of acrylic and methacrylic acid or together therewith, other ethylenically unsaturated monomers can be used in the manufacture of (meth)acrylic copolymers, the choice of the monomers depending largely on the desired properties of the coatings as regards hardness, elasticity, compatibility and polarity.

The following are examples of other suitable ethylenically unsaturated monomers: the alkyl esters of maleic, fumaric, tetrahydrophthalic, crotonic, isocrotonic, vinylacetic and itaconic acid, e.g. the corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters.

Small proportions of monomers containing at least two polymerisable olefinically unsaturated double bonds can also be used. Preferably the proportion of these monomers is below 5% by weight relative to the total weight of the monomers.

The following are examples of such compounds: hexanediol diacrylate, hexanediol dimethacrylate, ethylene glycol diacrylate, ethylene glycol dimethacrylate, butanediol diacrylate, butanediol dimethacrylate, hexamethylene bis methacrylamide, trimethylol propane triacrylate, trimethylol propane trimethacrylate and similar compounds.

Another suitable component can be a monovinyl aromatic compound. Preferably it contains 8 to 10 carbon atoms per molecule. The following are examples of suitable compounds: styrene, vinyl toluenes, α-methyl styrene, chlorostyrenes, o-, m- or p-methylstyrene, 2,5-dimethylstyrene, p-methoxystyrene, p-tert.butyl styrene, p-dimethyl-aminostyrene, p-acetamidostyrene and m-vinyl phenol. Vinyl toluenes and styrene are preferably used.

The carboxyl group-containing polymers can be formed by conventional methods (see e.g. B. Vollmert, Grundriss der makromolekularen Chemie, E. Vollmert-Verlag Karlsruhe 1982, Volume II, page 5 ff), from aliphatic and/or cycloaliphatic di-, tri- or polyhydric alcohols, optionally together with monohydric alcohols and aliphatic, aromatic and/or cycloaliphatic carboxylic acids and polyvalent polycarboxylic acids. The following are examples of suitable alcohols: ethylene glycol, 1,2-propanediol, 1,3-propanediol, 2,2-dimethyl-1,3-propanediol, 1,2-butanediol, 1,3-butanediol, 1,4-butanediol, 1,5-pentanediol, 3-methyl-1,5-pentanediol, 1,6-hexanediol, 2-ethyl-1,6-hexanediol, 2,2,4-trimethyl-1,6-hexanediol, 1,4-dimethylol cyclohexane, glycerol, trimethyl ethane, trimethylol propane, pentaerythritol, etherification products of diols and polyols, e.g. di- and triethylene glycol, polyethylene glycol or neopentyl glycol esters of hydroxy pivalic acid.

The following are examples of suitable carboxylic acids: adipic, azaleic, 1,3- and 1,4-cyclohexane-dicarboxylic acids, tetrahydrophthalic acid, hexahydrophthalic acid, endomethyl tetrahydrophthalic acid, isophthalic acid, o-phthalic acid, terephthalic acid and anhydrides thereof or esterifiable derivatives thereof.

The calculated molecular weight of the polyesters is e.g. between 500 and 2,000 g/mol.

The usable carboxy-functional poly(meth)acrylic copolymers and polyesters can be "chain-lengthened" by using a lactone. Lactones (cyclic esters) add on to carboxyl groups, thus opening the ring and producing a new terminal carboxyl group. Epsilon caprolactone is an example of a particularly preferred lactone.

The following are examples of other lactones: gamma-butyrolactone and lactones such as beta-priolactone, delta-valerolactone, delta-butyrolactone, zeta-enantholactone or eta-caprylolactone. These lactones can be substituted, e.g. 6-methyl-epsilon-caprolactone, 3-methyl-epsilon-caprolactone, 5-methyl-epsilon-caprolactone, 5-phenol-epsilon-caprolactone, 4-methyl-delta-valerolactone, 3,5-dimethyl-epsilon-caprolactone, or mixtures thereof.

The reaction with the lactone can take place e.g. directly after synthesis of the resin, i.e. after synthesis of the poly(meth)acrylic polymer and/or the polyester. The reaction occurs at e.g. elevated temperature, e.g. at temperatures up to 100° C. The reaction can be brought about e.g. with agitation, in for example up to 10 hours.

The catalysts for accelerating cross-linking between the epoxy-functionalised polysiloxanes 2) and the component 2a) are those described during the description of component 1c).

The proportions of components 2) and 2a) are preferably chosen so that the ratio of epoxy groups to carboxy groups is between 1:1.5 and 1.5:1, preferably 1:1.2 and 1.2:1.

The melamine resins mentioned under 2b) are the same as previously described under 1b).

The component 2c) is a polyamine component containing at least two functional groups having the formula

$R^4HN-$, where $R^4$ denotes a hydrogen atom or a straight-chain or branched alkyl radical with 1 to 10 carbon atoms or a cycloalkyl radical with 3 to 8, preferably 5 or 6 carbon atoms.

The polyamines can be diamines or amines with more than two amino groups, the amino groups being primary and/or secondary. The polyamines can also be e.g. adducts consisting of polyamines with at least two primary amino groups and at least one, preferably one, secondary amino group, with epoxy compounds, polyisocyanates and acryloyl compounds. Also suitable are amino amides and adducts of carboxy-functionalised acrylates with imines containing at least two amino groups.

Examples of suitable di- and polyamines are described e.g. in EP-A-0 240 083 and EP-A-0 346 982. The following are examples: aliphatic and/or cycloaliphatic amines with 2-24 carbon atoms containing 2-10 primary amino groups, preferably 2-4 primary amino groups, and 0-4 secondary amino groups.

The following are representative examples: ethylene diamine, propylene diamine, butylene diamine, pentamethylene diamine, hexamethylene diamine, 4-7-dioxa-decane-1,10-diamine, 1,2-diaminocyclohexane, 1,4-diaminocyclohexane, isophorone diamine, diethylene triamine, dipropylene triamine, 2,2-bis-(4-aminocyclohexyl)-propane, polyether polyamines, e.g. those having the trade name Jeffamine or Jefferson Chemical Company, bis-(3-aminopropyl)ethyl amines, 3-amino-1-(methylamino)-propane and 3-amino-1-(cyclohexylamino)-propane.

Use can also be made of conventional polyamines based on adducts of polyfunctional amine components with di- or polyfunctional epoxy compounds, e.g. compounds manufactured by using e.g. di- or polyfunctional epoxy compounds such as di-glycidyl or polyglycidyl ethers of (cyclo)aliphatic or aromatic hydroxy compounds such as ethylene glycol, glycerol, 1,2- and 1,4-cyclohexane diol, bisphenols such as bisphenol A, polyglycidyl ethers of phenol formaldehyde novolaks, polymers of ethylenically unsaturated groups containing epoxy groups, such as glycidyl(meth)acrylate, N-glycidyl(meth)acrylamide, and/or allyl glycidyl ethers, optionally copolymerised with various other ethylenically unsaturated monomers, glycidyl ethers of fatty acids with 6-24 C atoms, epoxidised polyalkadienes such as epoxidised polybutadiene, hydantoin epoxy resins, glycidyl group-containing resins such as polyesters or polyurethanes containing one or more glycidyl groups per molecule or mixtures of the aforementioned resins and compounds.

The polyamines are added to the aforementioned epoxy compounds by ring-opening the oxirane grouping. The reaction can take place e.g. at a temperature in the range from 20° to 100° C., preferably between 20° and 60° C., optionally catalysed with 0.1-2% by weight of a Lewis base such as triethylamine or an ammonium salt such as tetrabutyl ammonium iodide.

Polyamine isocyanate adducts can also be suitable polyamines. The following are conventional isocyanates for polyamine isocyanate adducts: aliphatic, cycloaliphatic and/or aromatic di-, tri- or tetra- isocyanates, which can be ethylenically unsaturated. The following are examples: 1,2-propylene diisocyanate, trimethylene diisocyanate, tetramethylene diisocyanate, 2,3-butylene diisocyanate, hexamethylene diisocyanate, 2,2,4-trimethyl hexamethylene diisocyanate, 2,4,4-trimethyl hexamethylene diisocyanate, ω, ω'-dipropyl ether diisocyanate, 1,3-cyclopentane diisocyanate, 1,2 and 1,4-cyclohexane diisocyanate, isophorone diisocyanate, 4-methyl-1,3-diisocyanate cyclohexane, trans-vinylidene diisocyanate, dicylohexyl-methane-4,4-diisocyanate, 3,3'-dimethyl dicyclohexylmethane-4,4'-diisocyanate, toluidene diisocyanate, 1,3-bis-(1-isocyanato-1-methylethyl)benzene, 1,4-bis-(1-isocyanato-1methylethyl)benzene, 4,4'-diisocyanatodiphenyl, 3,3'-dichloro-4,4'-diisocyanatodiphenyl, adducts of 2 mols of a diisocyanate, e.g. hexamethylene diisocyanate or isophorone diisocyanate, with 1 mol of diol, e.g. ethylene glycol, the adduct of 3 mols of hexamethylene diisocyanate with 1 mol of water (obtainable under the trade name Desmodur N from Bayer AG), the adduct of 1 mol trimethylol propane and 3 mols of toluidene diisocyanate (obtainable under the trade name Desmodur L from Bayer AG) and the adduct of 1 mol trimethylol propane and 3 mols of isophorone diisocyanate.

The polyamines are added to the aforementioned isocyanate compounds at a temperature in the range e.g. from 20° to 80° C., preferably 20° to 60° C., optionally catalysed by adding 0.1 to 1% by weight of a tertiary amine such as triethyl amine and/or 0.1 to 1% by weight of a Lewis acid such as dibutyl tin laurate.

As mentioned, the polyamines may also be adducts with acryloyl compounds. Examples of di- or polyfunctional acryloyl unsaturated compounds for producing polyamine adducts are described in U.S. Pat. Ser. No. 4,303,563, e.g. ethylene glycol diacrylate, diethylene glycol diacrylate, trimethylene glycol diacrylate, 1,3-butylene glycol diacrylate, 1,6-hexamethylene glycol diacrylate, trimethylol propane diacrylate, pentaerythritol tetraacrylate and pentaerythritol triacrylate. The following are other examples of suitable polyfunctional acryloyl unsaturated acrylates:

1) Urethane acrylates, obtainable by reaction of an isocyanate group of a polyisocyanate with a hydroxyacrylate, e.g. hexamethylene diisocyanate and hydroxyethyl acrylate. The manufacture is described in U.S. Pat. Ser. No. 3,297,745, 2) Polyether acrylates obtained by transesterification of a hydroxy-terminated polyether with acrylic acid, described in U.S. Pat. Ser. No. 3,380,831, 3) Polyester acrylates obtained by esterification of a hydroxyl group-containing polyester with acrylic acid, described in U.S. Pat. Ser. No. 3,935,173, 4) Polyfunctional acrylates, obtained by reaction of a hydroxyl-functionalised acrylate such as hydroxyethyl acrylate with a) Dicarboxylic acids with 4 to 15 carbon atoms,
b) Polyepoxides with terminal glycidyl groups,
c) Polyisocyanates with terminal isocyanate groups, described in U.S. Pat. Ser. No. 3,560,237, 5) Acrylate-terminated polyesters obtained by reaction between acrylic acid, a polyol with at least three hydroxy groups, and a dicarboxylic acid, described in U.S. Pat. Ser. No. 3,567,494, 6) Polyacrylate, obtained by reaction between acrylic acid and an epoxidised oil containing epoxy groups, e.g. soya-bean oil or linseed oil, described in U.S. Pat. Ser. No. 3,125,592, 7) Polyacrylate, obtained by reaction between acrylic acid and epoxy groups of a diglycidyl ether of bisphenol A, described in U.S. Pat. Ser. No. 3,373,075, 8) Polyacrylate, obtained by reaction of acrylic acid on an epoxy-functionalised vinyl polymer, e.g. polymers containing glycidyl acrylate or vinyl glycidyl ether, described in U.S. Pat. Ser. No. 3,530,100, 9) Polyacrylate, obtained by reaction of acrylic acid anhydride with polyepoxides, described in U.S. Pat. Ser. No. 3,676,398, 10) Acrylate urethane ester, obtained by reaction of a hydroxy alcohol acrylate with a diisocyanate and a hydroxyl-functionalised alkyd resin, described in U.S. Pat. Ser. No. 3,676,140, 11) Acrylate urethane polyesters, obtained by reaction of a polycaprolactone diol or triol with an organic polyisocyanate and with a hydroxyalkyl acrylate, described in U.S. Pat. Ser. No. 3,700,634 and 12) Urethane polyacrylate, obtained by reaction of a hydroxy-functionalised polyester with acrylic acid and a polyisocyanate, described in U.S. Pat. Ser. No. 3,759,809.

The acryloyl terminal groups of the di- or polyacrylic monomers or the polyacrylates in examples 1) to 12) can be functionalised with polyamines. The addition can take place e.g. at a temperature in the range from 20° to 100° C., preferably 40° to 60° C.

Another method of synthesising an amine-functionalised accelerator agent is described in EP-A-2801, where acrylic acid ester copolymers are amidated with diamines, splitting off alcohol. The resulting reactive group has the following structure:

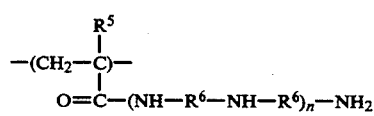

$R^5$=H or $CH_3$, $R^6$=alkylene groups with 2 or 3 carbon atoms, which can be the same or different and n=0, 1, 2 or 3 and the radical

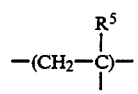

comes from the acrylic acid ester copolymer skeleton.

The acrylic acid ester copolymers have a number average molecular weight Mn of 1,000–20,000, preferably 2,000–5,000. The following are examples of possible comonomers: esters of (meth)acrylic acid such as methyl, ethyl, butyl or cyclohexyl(meth)acrylate, hydroxyethyl(meth)acrylate, hydroxypropyl(meth)acrylate, or (meth)acrylic acid, styrene and vinyl toluene.

Methyl acrylate is particularly preferred, since this monomer is particularly-easily accessible for aminolysis. The proportion of methacrylate in the copolymer is 2–35% by weight. The copolymers are manufactured by solution polarisation in conventional solvents such as toluene, xylenes, acetates, e.g. butyl acetate or ethyl glycol acetate, ethers such as tetrahydrofuran or aromatic mixtures such as the commercial product Solvesso 100. Synthesis of copolymers is known to the skilled man and does not need further explanation. The polyamines used during aminolysis must contain at least two primary or secondary amino groups, and have already been described.

The accelerators may also be products of a reaction between a (meth)acrylic acid copolymer and alkylene imines, as described in EP-A-0 179 954. The resulting functional groups have the structure:

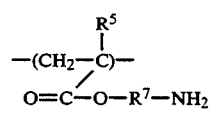

$R^5$=H or $CH_3$
$R^7$=an alkylene group with 2 to 4 C atoms, and the radical

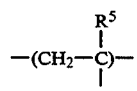

is defined as previously.

In addition to (meth)acrylic acid, the copolymer can contain esters of (meth)acrylic acid or vinyl compounds such as styrene. The comonomers used by way of example have already been described in the definition of the hydroxyl group-containing poly(meth)acrylates b). Propylene or butylene imine are examples of alkylene imines.

Other examples of polymers which can be used as accelerators according to the invention are substances produced by reacting copolymers of e-dimethyl-m-isopropenyl benzyl isocyanate having a number average molecular weight (Mn) of 1,000 to 10,000, with mono- or diketimines containing either an OH or a sec.NH grouping.

The comonomers for producing the TMI copolymers can be any conventional vinylically polymerisable monomers without OH-functionality, e.g. esters of (meth)acrylic acid such as methyl, ethyl, butyl, isobutyl, ethylhexyl, cyclohexyl and/or lauryl (meth)acrylate, or styrene, vinyl toluene and/or methyl styrene. The copolymers are produced by conventional radical solution polymerisation as known to the skilled man, e.g. in aprotic organic solvents such as toluene and xylene, and esters such as butyl acetate.

Conventional radical initiators such as peroxides and azo compounds are generally used for this purpose. The reaction is brought about e.g. with heating, for example at temperatures of 80° to 140° C.

The monomeric TMI can be copolymerised to an extent of 2 to 40% by weight relative to the weight of all the monomers, preferably to an extent of 2 to 25% by weight.

The isocyanate-terminated copolymers are then reacted with one or more mono- and/or dialdimines and/or mono- and/or diketene imines functionalised with OH or sec.NH.

The ketimines and/or aldimines (hereinafter the term "ketimines" is used for simplicity, but also includes aldimines), are manufactured e.g. by reacting alkanolamines or di- or triamines containing at least one primary amino group, and an extra secondary amino group in the case of di- or triamines, with aldehydes and/or ketones, with separation of water.

The following are examples of alkanolamines:

Monoethanolamine, monopropanolamine, monohexanolamine or 2-amino-2-hydroxy-propane.

The following are examples of di- or triamines carrying at least one primary amino group and one secondary amino group:

N-methyl propylamine, diethylene triamine, dipropylene triamine or bis-hexamethyl triamine.

In order to produce the TMI-acrylate/ketimine adducts, the primary amino groups of the aforementioned amines must be blocked.

In the process the primary amines are reacted with aldehydes or ketones, with separation of water, to form Schiff's bases, aldimines or ketimines. The following are examples of these aldehydes and ketones:

$C_3$–$C_{10}$ compounds, namely hexyl aldehyde, octyl aldehyde, diisopropyl ketone and/or methyl isobutyl ketone. The last two compounds are particularly preferred since they have only a slight tendency towards secondary reactions.

Preferably an insufficient amount of OH or sec.NH-functionalised mono- or diketimines is used for addition to the isocyanate-terminated copolymers. Preferably 90–95% of the isocyanate groups are reacted with OH or NH groups. The remaining excess isocyanate groups are urethanised in a last reaction step with monoalcohols such as ethanol, propanol or butanol.

In order to synthesise the ketimine or aldimine-functionalised (masked) polyamines, a TMI copolymer is e.g. first produced by radical solution polymerisation. Next, an alkanolamine or di- or triketimine, carrying at least one primary and also one secondary amine function, is placed together with the desired blocking agent (aldehyde or ketone) in an organic solvent forming an azeotropic mixture with water. The mixture is heated and the water produced during the reaction is azeotropically distilled off.

Advantageously the process is carried out under an inert gas. An excess of blocking agent can be used and distilled off after the reaction. Advantageously the masking agent is a ketone/aldehyde which itself forms an azeotropic mixture with water, thus avoiding the need for an additional organic solvent. In order to add the OH or sec.NH-functionalised ketimine or aldimine to the isocyanate-terminated copolymer, the ketimine is placed under inert gas e.g. at 80° C. and the copolymer is added at a controlled rate, e.g. in two hours. If required the reaction can be catalysed by a Lewis acid such as dibutyl tin laurate. If insufficient ketimine is present at the end of controlled addition, an alcohol, e.g. butanol, is added, optionally with agitation at elevated temperature for e.g. 10 to 30 minutes.

The aforementioned method of manufacture is only one example of the process. Alternatively the copolymer can be supplied first and the ketimine can be added.

The terminated (free) amino groups of the polyamine accelerator component can be masked, e.g. with ketones or aldehydes, to form Schiff's bases.

All the previously-described polyamines are very reactive towards the binder components according to the invention, resulting in a very short pot life. For this reason it may be advantageous to react the terminated amine groups on the aforementioned polyamines with aldehydes or ketones, with separation of water, to form Schiff's bases, aldimines or ketimines. The aldehydes and ketones used for masking may be $C_3$–$C_{10}$ compounds such as hexyl aldehyde, octyl aldehyde, diisopropyl ketone and/or methyl isobutyl ketone. The last two compounds are particularly preferred, since they have only a slight tendency to undergo secondary reactions.

The proportion of epoxy-functionalised polysiloxane 2) to 2c) in the hardenable lacquer is preferably chosen so that the ratio of epoxy groups to amine groups is between 1:1.5 and 1.5:1, preferably 1:1.2 and 1.2:1.

The epoxy-functionalised polysiloxanes already mentioned as component 3) can e.g. contain epoxy-functionalised (meth)acrylic monomers incorporated in the polymer. Some of the glycidyl groups present can be esterified with α, β-unsaturated carboxylic acids, thus incorporating unsaturated groupings in the resin. This is described e.g. in DE-A-40 27 259.

Partial reaction of glycidyl groups with α, β-unsaturated carboxylic acids to form the component 3) can be brought about e.g. by introducing one or more α, β-unsaturated carboxylic acids into a polysiloxane/acrylic resin solution heated e.g. to 50° to 100° C., e.g. 80° C., until the desired acid number is reached. This can be brought about e.g. by dropwise addition. Agitation is continued until the acid number is preferably below 1 mg KOH/g.

The following are examples of acids which can be used: mono-or polyunsaturated monocarboxylic acids e.g. with 2 to 20, preferably 3 to 6 carbon atoms, e.g. cinnamic acid, crotonic acid, citraconic acid, mesaconic acid, dihydro-laevulinic acid, sorbic acid and preferably acrylic acid and/or methacrylic acid.

The acid is preferably used in a proportion such that the ratio of acryloyl groups to epoxy groups is 8:2 to 2:8, preferably 7:3 to 3:7.

The cross-linking component 3a) can be a polyamine, corresponding to the polyamines already described in 2c).

The ratio of epoxy and acryloyl groups to amine groups is chosen to be between 1:1.5 and 1.5:1, preferably between 1:1.2 and 1.2:1.

The CH-acid component 3b) of use according to the invention as cross-linking agent for component 3) can be manufactured e.g. by transesterifying an aliphatic β-ketocarboxylic acid ester with a polyol.

The following are examples of suitable β-ketocarboxylic acids: esters of aceto-acetic acid or alkyl-substituted aceto-acetic acids such as α- and/or γ-methyl aceto-acetic acid. Suitable esters of these acids comprise aliphatic alcohols, preferably lower alcohols with 1 to 4 carbon atoms, such as methanol, ethanol or butanol.

In a preferred embodiment of the invention, the polyols for reacting with the β-ketocarboxylic esters can be monomers and polymers chosen from among i) Polyols from the group of straight-chain or branched alkane diols and polyols with 2 to 12 carbon atoms, ii) Hydroxyl group-containing poly(meth)acrylates or poly(meth)acrylamides based on (meth)acrylic acid hydroxyalkyl esters or (meth)acrylic acid hydroxyalkyl amides each with 2 to 12 carbon atoms in the alkyl part, optionally copolymerised with α, β-unsaturated monomers, with a number average molecular weight (Mn) of 1,000 to 10,000.

iii) Hydroxyl group-containing poly(meth)acrylates based on (meth)acrylic acid hydroxyalkyl esters with 2 to 12 carbon atoms in the alkyl part and optionally copolymerisable α, β-unsaturated monomers modified with cyclic esters of hydroxycarboxylic acids containing 4 to 6 carbon atoms, with a number average molecular weight (Mn) of 1,000 to 10,000 and iv) Polyester polyols or polyether polyols, in each case with a number average molecular weight (Mn) of 500 to 2,000.

The alkane di- and polyols in group i) can contain straight or branched chains with 2–12 carbon atoms. They contain at least two hydroxy groups, or preferably at least three. Propanediol, butanediol, hexanediol, glycerol, trimethylol propane and pentaerythritol are examples.

The following are examples of hydroxyl group-containing poly(meth)acrylates ii) based on (meth)acrylic acid hydroxyalkyl esters with 2 to 12 carbon atoms in the alkyl part: hydroxyalkyl esters of acrylic acid or methacrylic acid with alcohols containing at least two hydroxyl groups, such as 1,4-butanediol, mono(meth)acrylate, 1,6-hexanediol-mono(meth)acrylate or 1,2,3-propanetriol mono(meth)acrylate. The hydroxyl group-containing poly(meth) acrylamides ii) based on (meth)acrylic acid hydroxyalkyl amides can be amides of acrylic acid or methacrylic acid with hydroxyalkyl amines or di(hydroxyalkyl) amines each containing 2 to 12 carbon atoms in the alkyl part and containing one or more hydroxyl groups, such as acrylic acid hydroxyethyl amide. The expression (meth)acrylic used in the present description and the claims denotes acrylic and-/or methacrylic.

The hydroxyl group-containing poly(meth)acrylates in component ii) can be homo or copolymers. They have a number average molecular weight of 1,000 to 10,000, preferably 3,000 to 6,000. Copolymerisable monomers for producing the copolymers are α, β-unsaturated monomers, or radically polymerisable monomers selected from esters of α, β-unsaturated carboxylic acids, e.g. acrylic acid or methacrylic acid, and the alcohol components of the esters are e.g. methyl, ethyl or propyl alcohol or isomers and higher homologues thereof. Other examples are diesters of maleic or fumaric acid, the alcohol component being the same as previously mentioned. Other examples are vinyl aromatic compounds such as styrene, α-methyl styrene and vinyl toluene. Other examples are vinyl esters of short-chain carboxylic acids, such as vinyl acetate, vinyl propionate and vinyl butyrate.

The hydroxyl group-containing poly(meth)acrylates in the previously-defined component iii) can be modified poly(meth)acrylate homo or copolymers, as described in ii), in which the hydroxyl groups are completely or partly reacted with cyclic esters such as hydroxy-carboxylic acids with 4 to 6 carbon atoms, e.g. butyrolactone or caprolactone. The resulting modified poly(meth)acrylates in component iii) have a number average molecular weight Mn of 1,000 to 10,000.

The polyester polyols and polyether polyols in component iv) can have a number average molecular weight Mn of 500 to 2,000. Special examples are reaction products of di- or tricarboxylic acids such as adipic acid or trimellitic acid with polyols, the polyols being present in excess. Other examples are transesterification products of di- or triols such as propanediol, butanediol or glycerol with ethylene oxide or propylene oxide. The CH acid components can be synthesised e.g. in a number of stages. The polyol is first transesterified with the aliphatic β-ketocarboxylic acid ester after removing any solvent present.

The polyol can be transesterified as follows: the polyol, optionally freed from solvent by applying a vacuum, is first supplied. The β-ketocarboxylic acid ester is then added in excess, e.g. dropwise. The reaction is brought about at elevated temperature and the evolved alcohol is removed from the system.

The reaction can also be accelerated by adding a catalyst, e.g. an acid such as formic acid or p-toluenesulphonic acid. Advantageously during the transesterification the reaction temperature is continuously increased (e.g. in steps of 10° C./20 minutes) until a temperature just (about 10° C.) below the boiling-point of the β-ketocarboxylic acid ester is reached. After quantitative transesterification, the excess β-ketocarboxylic acid ester is removed, e.g. by applying a vacuum. The mixture is then cooled and adjusted to the desired content of solids, using an inert solvent.

The accelerator component 3b) can also contain a reactive diluent in the form of 2-aceto-acetoxy-ethyl methacrylate for adjusting the viscosity.

Aceto-acetic ester-functionalised components can be given increased CH-acidity by reacting the β-carbonyl groups with primary and/or secondary monomers, as described e.g. in DE-A-39 32 517.

The component 3b) preferably contains one or more mixed-in catalysts in the form of Lewis bases or Brönstedt bases, the conjugated acids in the latter substance having a pKA value of at least 10. The following substances have been found particularly suitable: Lewis bases, e.g. cyclo-aliphatic amines, such as diaza-bicyclo-octane (DABCO), tert.-aliphatic amines such as triethylamine, tripropylamine, N-methyl diethanolamine, N-methyl diisopropylamine or N-butyl-diethanolamine, or amidines such as diaza-bicyclo-undecene (DBU) and guanidines such as N,N,N',N'-tetramethyl guanidine. The following are other examples: alkyl or aryl-substituted phosphanes such as tributyl phosphane, triphenyl phosphane, tris-p-tolyl phosphane, methyl-diphenyl phosphane, or hydroxy and amine-functionalised phosphanes such as tris-hydroxymethyl phosphane or tris-dimethylamino ethyl phosphane.

The following are examples of suitable Brönstedt bases: alcoholates such as sodium or potassium methylate, quaternary ammonium compounds such as alkyl, aryl or benzyl ammonium hydroxides or halides, e.g. tetraethyl or tetrabutyl ammonium hydroxide or fluoride, or trialkyl or triaryl phosphonium salts or hydroxides.

The proportion of catalysts is preferably 0.01 to 5% by weight, preferably 0.02 to 2% by weight relative to the total content of solids in components 3) and 3b).

The cross-linking agents mentioned in 3c) are substances containing at least two transesterifiable groups originating from e.g. one or more of the following groupings, which can be the same or different:

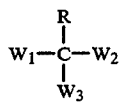

in which R=alkyl or preferably H,

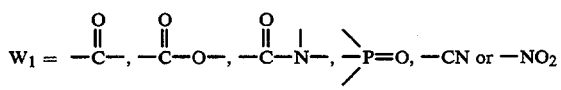

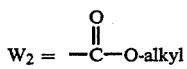

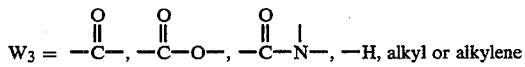

and alkyl and alkylene preferably contain 1 to 6 carbon atoms and the carboxyl or carboxylic amide groups previously defined for the radicals W1, W2 and W3 are each bonded to the CR group via the carbon atom, and the CR group is bonded to a polymeric or oligomeric unit via at least one of the radicals W1, W2 and/or W3. The functionality of component 3c) is over 2 per molecule on average.

As previously mentioned, the functionality of component 3c) on average is over 2. This means that monofunctional molecules can also be used in a mixture with poly-functional molecules.

The previously-described cross-linking components 3c) contain W2 together with at least one ester group which can cross-link with hydroxyl group-containing compounds in a transesterification reaction.

Preferably the cross-linking compounds are substantially free from primary, secondary or tertiary amino groups, since these adversely influence the stability in storage and the resistance to light.

The following are examples of cross-linking components 3c) capable of transesterification and coming under the previously preferred general formula. These examples will hereinafter be divided into three groups A1, A2 and A3.

In group A1, the molecule on average contains at least two groups derived from methane tricarboxylic acid monoamide units or aceto-acetic acid ester-2-carboxylic acid amides.

The compounds A1 can e.g. be products of a reaction between polyisocyanates and malonic acid diesters such as malonic acid dimethyl, diethyl, dibutyl or dipentyl ester or aceto-acetic acid esters such as aceto-acetic acid methyl, ethyl, butyl or pentyl ester.

The aforementioned isocyanates of use according to the invention can e.g. be cycloaliphatic, aliphatic or aromatic polyisocyanates such as tetramethylene diisocyanate, hexamethylene diisocyanate, 2,2,4-trimethylene diisocyanate, 1,12-dodecane diisocyanate, cyclohexane-1,3- and 1,4-diisocyanate, 1-isocyanato-3,3,5-trimethyl- 5-isocyanato-methyl cyclohexane (=isophorone diisocyanate IPDI), perhydro-2,4'- and/or -4,4'- diphenyl methane diisocyanate, 1,3 and 1,4-phenylene diisocyanate, 2,4 and 2,6-toluylene diisocyanate, diphenyl methane-2,4'- and/or -4,4'-diisocyanate, 3,2'- and/or 3,4-diisocyanato-4-methyl diphenyl methane, naphthylene-1,5-diisocyanate, triphenyl methane-4,4'-triisocyanate, tetramethyl xylylene diisocyanate or mixtures of these compounds.

In addition to these simple isocyanates, use may also be made of substances containing hetero-atoms in the radical linking the isocyanate groups, e.g. polyisocyanates containing carbodiimide groups, allophanate groups, isocyanurate groups, urethane groups, acylated urea groups or biuret groups.

The known polyisocyanates mainly used in the manufacture of lacquers that are particularly suitable for the invention include e.g. modification products of the aforementioned simple polyisocyanates containing biuret, isocyanurate or urethane groups, more particularly Tris-(6-isocyanatohexyl)-biuret or low-molecular polyisocyanates containing urethane groups obtainable by reacting an excess of IPDI with simple monovalent alcohols in the molecular weight range 62 to 300, more particularly with trimethylol propane. Of course, any mixtures of the aforementioned polyisocyanates can be used to obtain the products according to the invention.

The polyisocyanates may also be known prepolymers containing terminal isocyanate groups, obtainable more particularly by reacting the aforementioned simple polyisocyanates, particularly diisocyanates, with excess quantities of organic compounds containing at least two groups which react with isocyanate groups. The preferred compounds contain a total of at least two amino groups and/or hydroxyl groups and have a number average molecular weight of 300 to 10,000, preferably 400 to 6,000. Preferably use is made of the corresponding polyhydroxyl compounds, e.g. hydroxy-polyesters, hydroxypolyethers and/or hydroxyl group-containing acrylate resins known per se in polyurethane chemistry.

In these known prepolymers, the ratio of isocyanate groups to hydrogen atoms reactive with NCO is 1.05 to 10:1, preferably 1.1 to 3:1, the hydrogen atoms preferably originating from hydroxyl groups.

The nature and proportions of the starting materials used in the manufacture of NCO prepolymers is also preferably chosen so that the NCO prepolymers (a) have an average NCO functionality of 2 to 4, preferably 2 to 3 and (b) have a number average molecular weight of 500–10,000, preferably 800 to 4,000.

The compound A1 can also be a product of a reaction between monoisocyanates and esters or partial esters of polyhydric alcohols of malonic acid. The following are examples of polyhydric alcohols: dihydric to pentahydric alcohols such as ethanediol, the various propane, butane, pentane and hexane diols, polyethylene and polypropylene diols, glycerol, trimethylol ethane and propane, pentaerythritol, hexanetriol and sorbitolo The following are examples of suitable monoisocyanates: aliphatic isocyanates such as n-butyl isocyanate, octadecyl isocyanate, cycloaliphatic iso- cyanates such as cyclohexyl isocyanate, araliphatic isocyanates such as benzyl isocyanate or aromatic isocyanates such as phenyl isocyanate.

Use can also be made of the corresponding malonic esters of OH group-containing acrylic resins, polyesters, polyurethanes, polyethers, polyester amides and imides and/or products of a reaction between aliphatic and aromatic epoxy resins and malonic acid semi-esters such as malonic acid monoethyl ester. Suitable epoxy resins include e.g. epoxy group-containing acrylate resins, glycidyl ethers of polyols such as hexanediol, neopentyl glycol, diphenyl propane or methane and glycidyl group-containing hydantoins or mixtures of these compounds.

The examples in the following group A2 have a suitable accelerator component containing at least two groups having the formula (II)

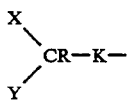
(II)

or structural units having the formula (II')

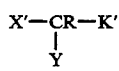

in which

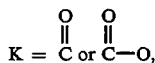

the last-mentioned group being bonded to the CH group via the C atom, and

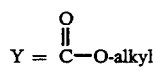

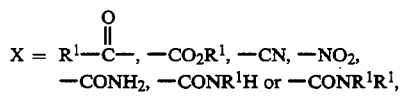

and the radicals $R^1$ can be the same or different and stand for a hydrocarbon radical, preferably an alkyl radical with 1 to 12, preferably 1 to 6 carbon atoms, which can also be interrupted by oxygen or an N-alkyl radical,

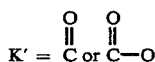

the latter group being bonded to the CR group via the C atom, and

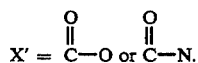

The number of groups (II) in the accelerator is preferably 2 to 20, more particularly 2 to 10, the larger numbers relating to oligomeric or polymeric products and being average values in the present case.

Preferably the accelerator component A2 of use according to the invention represents the formula (III)

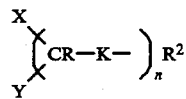

in which X, Y and K have the previously-given meaning, $R^2$ denotes the radical of a polyol

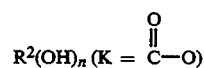

or the radical $R^2$ of a polycarboxylic acid

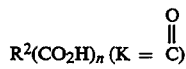

and n is at least 2, preferably 2 to 20, more particularly 2 to 10. In the case of oligomeric or polymeric accelerator components, these numbers are average values as before.

Preference is also given to accelerator components in group A2 and obtained by non-quantitative esterification of compounds having the formula (IV) or formula (V)

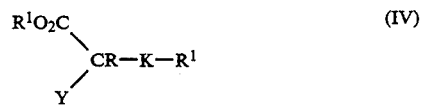
(IV)

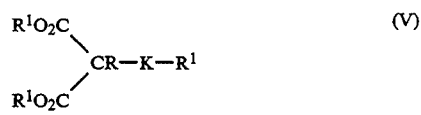
(V)

with polyols $R^2(OH)_n$, where Y, K and $R^1$ have the previous meanings and the radicals $R^1$ can be the same or different.

The previously-mentioned polyols $R^2(OH)_n$ can be a polyhydric alcohol preferably containing 2 to 12, particularly 2 to 6 C atoms. The following are examples: ethylene glycol, propylene glycol-(1,2) and -(1,3), butylene glycol (1,4) and -(2,3), di-β-hydroxy-ethyl butanediol, hexanediol-(1,6), octanediol-(1,8), neopentyl glycol, cyclohexanediol-(1,6), 1,4-bis-(hydroxymethyl)-cyclohexane, 2,2-bis-(4-hydroxycyclo-hexyl)-propane, 2,2-bis-(4-(β-hydroxyethoxy)phenyl)propane, 2-methyl-1,3-propanediol, glycerol, trimethylol propane, hexanetriol-(1,2,6), butanetriol-(1,2,4), Tris-(β-hydroxylethyl) isocyanurate, trimethylol ethane, pentaerythritol and hydroxy-alkylation products thereof, or diethylene glycol, triethylene glycol, tetraethylene glycol, polyethylene glycols, dipropylene glycol, tripropylene glycol, polypropylene glycols, dibutylene glycol, polybutylene glycols and xylylene glycol. Use can also be made of polyesters obtained from or with lactones, e.g. ε-caprolactone or hydroxycarboxylic acids such as hydroxy-pivalic acid, γ-hydroxydecanonic acid, γ-hydroxycaproic acid or thioglycolic acid. In the case of these polyhydric alcohols, the subscript n in the aforementioned formula (III) preferably stands for 2 to 4.

Alternatively the polyol can be an oligomeric or polymeric polyol compound (polyol resin) having a number average molecular weight Mn (determined by gel chromatography; polystyrene standard) usually in the range from about 170 to 10,000, preferably about 500 to about 5,000. In special cases, however, Mn can be 10,000 g/mol or more. The oligomers/polymers can be polymerisates, polycondensates or poly-addition compounds. The hydroxyl number is usually 30 to 250, preferably 45 to 200 and particularly 50 to 180 mg KOH/g. These OH group-containing compounds may optionally also contain other functional groups such as carboxyl groups.

These polyols may e.g. be polyether polyols, polyacetal polyols, polyester amide polyols, polyamide polyols, epoxy resin polyols or reaction products thereof with $CO_2$, phenolic resin polyols, polyurea polyols, polyurethane polyols, cellulose ester and ether polyols, partly saponified homo- and copolymers of vinyl esters, partly acetalised polyvinyl alcohols, polycarbonate polyols, polyester polyols or acrylate resin polyols. Polyether polyols, polyester polyols, acrylate resins and polyurethane polyols are preferred. These polyols, which can also be used in a mixture, are described e.g. in DE-OS 31 24 784.

Examples of polyurethane polyols are obtained from a reaction between di- and polyisocyanates with an excess of di- and/or polyols. The isocyanates can e.g. be hexamethylene diisocyanate, isophorone diisocyanate, toluylene diisocyanate or isocyanates formed from three mols of a diisocyanate such as hexamethylene diisocyanate or isophorone diisocyanate, and biurets resulting from a reaction between 3 mols of a diisocyanate and 1 mol of water. Suitable polyurea polyols can be obtained in similar manner by reacting di- and polyisocyanates with equimolar quantities of amino alcohols, e.g. ethanolamine or diethanolamine.

The polyester polyols can e.g. be known polycondensates of di- or polycarboxylic acids or anhydrides thereof such as phthalic acid anhydride or adipic acids, or polyols such as ethylene glycol, trimethylol propane, glycerol, etc.

Suitable polyamide polyols can be obtained in similar manner to the polyesters, the polyols being at least partly replaced by polyamines such as isophorone diamine, hexamethylene diamine or diethylene triamine.

The polyacrylate polyols or OH group-containing polyvinyl compounds can e.g. be known copolymers of hydroxyl group-containing (meth)acrylic acid esters or vinyl alcohol and other vinyl compounds, such as styrene or (meth)acrylic acid esters.

The aforementioned polycarboxylic acids $R^2(CO_2H)_n$, where n preferably denotes 2 to 4, can be aliphatic, cyclo-aliphatic, aromatic and/or heterocyclic and are optionally substituted, e.g. by halogen atoms, and/or saturated. The following are examples of these carboxylic acids and their derivatives: succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, 1,3- and 1,4-cyclohexane-dicarboxylic acid and tetrachlorophthalic acid, endomethylene tetrahydrophthalic acid and its hexachloro derivative, glutaric acid, maleic acid, fumaric acid, dimeric and trimeric fatty acids such as oleic acid, optionally mixed with monomeric fatty acids or cyclic monocarboxylic acids such as benzoic acid, p-tert-butyl benzoic acid or hexahydrobenzoic acid. The reaction products of the aforementioned polyols $R^2(OH)_n$ with cyclic carboxylic anhydrides can also be used.

The accelerator component A2 usable according to the invention, depending on the nature of the polyol or polycarboxylic acid component, may be a relatively viscous liquid or a solid which is substantially soluble at least in conventional lacquer solvents and preferably contains less than 5% by weight, more particularly less than 1% by weight of cross-linked components. The transesterification equivalent weight, which measures the proportion of groups (II) or structural units (II') in (A2), is usually between 100 and 5,000, preferably 200 and 2,000 and the number average molecular weight Mn is usually between 200 and 10,000, preferably between 500 and 5,000 (determined by gel chromatography; polystyrene standard). Methods of producing these compounds are described in detail in EP-A-0 310 011.

Other examples of the accelerator component usable according to the invention are of type A3, in which the transesterifiable grouping is derived from a compound with the grouping —CO—CRR$^3$—COOR$^4$, where R$^3$ denotes $C_1$-$C_8$ alkyl or H, preferably hydrogen, and R$^4$=alkyl, e.g. methyl, ethyl, butyl or t-butyl.

The aforementioned groupings of A3 can be bonded to at least one polyvalent monomeric or polymeric compound. They can for example be bonded to at least one compound selected from mono- or polyhydric alcohols, OH group-containing polymers, polyamines and polymercaptans. They are polyvalent with regard to the transesterification group. For example, they can be produced by esterifying a polyepoxide with a dicarboxylic acid monoester, forming e.g. malonic acid monoester. The result is a component A3 containing one transesterifiable group per epoxy group. Aromatic or aliphatic polyepoxides can be used.

The dicarboxylic acid monoesters can also be malonic acid monoalkyl esters or acetone dicarboxylic acid monoalkyl esters in which the alkyl radical is straight-chain or branched with 1 to 6 atoms, e.g. methyl, ethyl, n-butyl or t-butyl.

The accelerator component 3c) can be produced in conventional solvents. It is advantageous to use solvents which do not cause trouble later during the manufacture of the coating agent. It is also advantageous to keep the content of organic solvents to a minimum. If the accelerator component 3c) contains polar groups, e.g. amide or urethane groupings, a slight dispersion in water is possible. This can also optionally be assisted by the fact that the cross-linking components contain neutralisable ionic groups, e.g. carboxyl groups, in the oligomeric or polymeric skeleton. Cross-linking agents of this kind, comprising ionic groups, can be easily dispersed in water. The content of organic solvents can be reduced to low values without substantially increasing the viscosity of the cross-linking solution.

The ratio of 3) to 3c) is advantageously chosen so that the proportion of OH groups 3) obtained by the addition reaction between the $\alpha$, $\beta$-unsaturated acids on the glycidyl groups and the transesterifiable groups is between 1:1.5 and 1.5:1, preferably between 1:1.2 and 1.2:1. Also, the unsaturated bonds in the resin 3) can be polymerised in the presence of radical initiators, resulting in a further cross-linking effect. The radical initiators can e.g. be the previously-described initiators for polymerising the monomers.

The binder compositions according to the invention can be formulated in conventional manner to obtain coating agents, usually by adding solvents or water.

The organic solvents for producing coating agents, e.g. lacquers, can be those used for manufacturing the individual components 1), 1a)–1c), 2), 2a)–2c), 3), 3a)–3c). These solvents may e.g. be organic solvents such as aliphatic or aromatic hydrocarbons, e.g. toluene or xylene, mixtures of aliphatic and/or aromatic hydrocarbons, esters, ethers or alcohols. These are conventional lacquer solvents. Aqueous solvents can also be prepared for manufacturing the coating agents from the binders according to the invention. If required, suitable emulsifiers can be used, as is conventional in the lacquer sector.

Conventional additives, normally used in the lacquer sector, can be used to produce the coating agent. The additives can be pigments, e.g. transparent or opaque colouring pigments such as titanium dioxide or carbon black or decorative pigments such as metal scale pigments and/or nacreous pigments.

The binder compositions according to the invention are particularly suitable for coating agents giving protection against dirt.

The additives may also be fillers such as talcum or silicates, plasticisers, light-resisting agents, stabilisers or levelling agents such as silicone oils.

The coating agents produced from the binders according to the invention can be given the desired viscosity for application by suitably adjusting the addition of solvents and/or water and/or additives.

The coatings produced from the coating agents can be hardened over a wide temperature range from e.g. $-10°$ C. to $200°$ C., depending on the nature of the particular cross-linking reactions.

The coating agents made from the binders according to the invention are suitable for coatings which adhere to a number of substrates, e.g. wood, textiles, plastics, glass, ceramics, plaster, cement and particularly metal. The coating agents can also be used in multi-layer processes, e.g. applied to conventional primers, base lacquers, fillers or existing lacquer top coats.

A particularly advantageous application of the binders according to the invention is for the preparation of coating agents for lacquers having a strong dirt-repelling effect. The invention therefore also relates to methods of producing coatings on various substrates, in which a coating agent made from the binders according to the invention is applied to the substrate, dried and hardened. The invention also relates to use of the binder compositions according to the invention in lacquer top-coats or clear lacquers.

In all cases the coating agents produced from the binders according to the invention give films having good hardness and good resistance to water and solvents, more particularly a strong dirt-repelling effect. This effect, e.g. the anti-graffiti effect, is retained for long periods even under unfavourable weather conditions.

The coating agents according to the invention can be applied in conventional manner, e.g. by immersion, spraying, painting or electrostatically.

The following examples illustrate the invention. All parts (German abbreviation T) are by weight.

EXAMPLE 1

Manufacture of a binder according to the invention:

220 parts of α, ω-hydroxy functional polydimethyl siloxane I and 170.5 parts of xylene were placed in a 4-litre 3-necked flask equipped with agitator, dropping funnel and reflux condenser, and heated to boiling. Next, a mixture of 5.5 parts acrylic acid 56 parts butyl methacrylate 97 parts ethyl hexyl acrylate 144 parts styrene 176 parts methyl methacrylate 30 parts butyl acrylate 620.4 parts hydroxypropyl methacrylate and 31.9 parts tert.butyl perbenzoate was added continuously in controlled manner within 5 hours. Thereafter, 60.5 parts of xylene and 2.9 parts of butyl perbenzoate were added and agitated with reflux for a further 2 hours. The mixture was then adjusted to a content of 55.1% solids, using 565 parts of butyl acetate.

Polydimethyl siloxane (I):

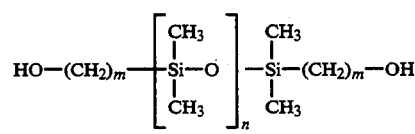

n=approx. 10 m=2.

EXAMPLE 2

Manufacture of a binder according to the invention 400 parts of α, ω-hydroxy functional polydimethyl siloxane (I) and 600 parts of butyl acetate were heated to 142° C. in a 4-litre 3-necked flask equipped with agitator, dropping funnel and reflux condenser. Next, a mixture of 5 parts acrylic acid 48.2 parts butyl methacrylate 88.2 parts ethyl hexyl acrylate 131 parts styrene 160 parts methyl methacrylate 40 parts butyl acrylate 564 parts hydroxypropyl methacrylate and 29 parts tert.butyl perbenzoate was added continuously in controlled manner within 5 hours. Thereafter a further 48.6 parts of butyl acetate and 2.6 parts of tert.butyl perbenzoate were added and agitated with reflux for a further two hours. The mixture was then adjusted to a content of 56.0% solids, using 498.3 parts of butyl acetate.

Comparative test A

Manufacture of a binder without polysiloxane

The procedure was as in Examples 1 and 2, except that the polysiloxane was replaced by a corresponding amount of Solvesso 100 (a mixture of aromatic hydrocarbons). 320 parts of Solvesso 100 and 169.5 parts of butyl acetate were heated to 142° C. in a 4-litre 3-necked flask equipped with agitator, dropping funnel and reflux condenser. Next, a mixture of 4.8 parts acrylic acid 59.1 parts butyl methacrylate 91 parts ethyl hexyl acrylate 161 parts styrene 171 parts methyl methacrylate 32 parts butyl acrylate 555 parts hydroxypropyl methacrylate and 30.1 parts tert.butyl perbenzoate was continuously added in controlled manner within 5 hours. Thereafter an additional 53.4 parts butyl acetate and 2.6 parts tert.butyl perbenzoate were added and agitated with reflux for a further 2 hours. The mixture was then adjusted to a content of 54.5% solids, using 348.9 parts butyl acetate.

EXAMPLE 3

Production of lacquers

Lacquer example 3a) 56 parts of the binder in Example 1 4 parts of butyl glycol acetate 0.6 parts of a benzotriazole derivative (UV stabiliser) 0.6 parts of a solution of a sterically hindered amine 0.1 parts of a commercial silicone-containing levelling agent 18.7 parts of a mixture of low-molecular esters and 20 parts of a biuret of an aliphatic isocyanate were homogeneously mixed. The mixture was then applied to a commercial top-coat lacquer based on organic solvents, wet-on-wet in two to three spraying operations, the dry film thickness being 30–100 μm. The lacquer was then hardened at room temperature for 16 hours.

Lacquer example 3b)

The procedure was the same as in Example 3a) except that the binder in Example 1 was replaced by the binder in Example 2.

Lacquer example 3c) (comparison)

The procedure was as in Example 3a) except that the binder in Example 1 was replaced by the binder in the comparative test A.

Comparative test B

The procedure was the same as in Example 3a) except that the binder in Example 1 was replaced by a homogeneous mixture of 52 parts of the binder in the comparative test A and 4 parts of the polysiloxane from the description of Examples 1 and 2.

The following tests were made:

Surface tension: The surface tension can serve as a criterion for measuring the adhesion of paint to surfaces. The measurement was made with standardised test inks which have a defined surface tension and contract on the object after application.

Test ink by Messrs ARCOTEC.

After 100 WOM: The surface tension measurement and the unsticking test were made after 24 hours and 100 hours, during which the metal sheet was subjected to a weatherometer (WOM) sunshine test.

Unsticking: After the lacquer had hardened, the object was sprayed with commercial spray-can lacquers. After the lacquer layer had dried, an adhesive strip was stuck on the surfaces. If the spray-can lacquer layer was also removed when the strip was torn off, the desired unsticking had occurred (verdict: satisfactory), whereas if the lacquer remained on the metal, the test result was unsatisfactory.

Resistance to chemicals The test was made with the following solvents: xylene, ethyl glycol and methoxypropyl acetate to DIN 53 168.

|  | | Unsticking | | |
| --- | --- | --- | --- | --- |
| Lacquer example | Surface tension 24 h | After 1000 h WOM | 24 h | After 1000 h WOM | Resistance to chemicals |
| 3a | <30 mN/m | <30 mN/m | Satisf. | Satisf. | Satisf. |
| 3b | <30 mN/m | <30 mN/m | Satisf. | Satisf. | Satisf. |
| 3c (comparison) | 38–40 mN/m | 38–40 mN/m | Unsatisf. | Unsatisf. | Satisf. |
| Comparative Test B | <30 mN/m | 38–40 mN/m | Satisf. | Unsatisf. | Satisf. |

EXAMPLE 4

Production of an aqueous clear varnish a) Production of an aqueous emulsion:

84 parts of a 20% aqueous solution of an emulsifier based on a polyoxypropylene polyoxyethylene sorbitan acid diester were placed in a 1-litre flask at 60° C. The mixture was agitated with an agitator rotating at a speed of about 8,500 rpm. 256 parts of the polyacrylate manufactured in Example 1 and 66 parts of completely demineralised water were added within 3 minutes. The resulting milky-white emulsion had a solids content of 39.5%.

b) Aqueous clear lacquer composition 85.1 parts of emulsion from Example 4a) and 15.1 parts of Cymel 327 (commercial water-soluble melamine resin).

The aqueous clear lacquer was applied with a doctor blade in a dry film thickness of about 30 μm on a glass plate and, after exposure to air for 20 minutes (10 minutes at room temperature, 10 minutes at 80° C.) was stoved at 140° C. for 20° minutes.

The result was a clear film having great hardness and low surface tension.

We claim:

1. A polymeric coating agent which comprises a polymer formed from the free radical initiated polymerization of:
   (i) from 60 to 97 wt. % based on the solids content of the coating agent of one or more (meth)acrylic monomers and optionally one or more additional monomers the polymerization of which can be initiated by free radicals,
   (ii) in the presence of from 3 to 40 wt. % based in the solid contents of the coating agent of at least one $\alpha$, $\omega$-hydroxy-, carboxy-, and/or epoxy-functional polysiloxanes of the formula (I)

$$R-\underset{\underset{R'}{|}}{\overset{\overset{R'}{|}}{Si}}-O-\left(\underset{\underset{R'}{|}}{\overset{\overset{R'}{|}}{Si}}-O\right)_n-\underset{\underset{R'}{|}}{\overset{\overset{R'}{|}}{Si}}-R \quad (I)$$

wherein R' can be the same or different and is $C_{1-6}$ alkyl, and R can be the same or different and is —Alk—OH, —Alk—(OAlk)$_p$—OH, —Alk—(O—C(=O)—Alk'—O)$_{\overline{m}}$H, —Alk—O—CH$_2$—CH$\underset{\diagdown O \diagup}{\text{———}}$CH$_2$ or —Alk—O—C(=O)—Alk—COOH wherein Alk and Alk' are $C_{1-6}$ alkylene and the alkylene groups in a molecule can be the same or different, n is a cardinal number from 8 to 40, m is a cardinal number from 2 to 30, and p is a cardinal number from 1 to 20.

2. The polymeric coating agent of claim 1, wherein in the polysiloxane of formula (I) all radicals R' are the same and each is a methyl group.

3. The polymeric coating agent of claim 1, wherein Alk in formula (I) is a $C_{2-3}$ alkylene group, and Alk' is a $C_5$ alkylene group.

4. The polymeric coating agent of claim 1, wherein R is

—(CH$_2$)$_3$—OH;

—(CH$_2$)—(OCH$_2$CH$_2$)$_{10}$—OH;

—(CH$_2$)$_3$—O—C(=O)—(CH$_2$)$_5$—O$_{\overline{m}}$H;

wherein m is a cardinal number from 2 to 30,

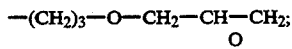

or

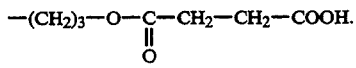

5. The polymeric coating agent of claim 1, wherein the (meth)acrylic monomer is an alkyl (meth)acrylate containing 1 to 18 carbon atoms in the alkyl part.

6. The polymeric coating agent of claim 5, wherein at least one alkyl(meth)acrylate has one or more primary or secondary hydroxyl group or an epoxy group in the alkyl part.

7. The polymeric coating agent of claim 1, wherein at least one (meth)acrylic monomer contains a carboxyl group and/or the coating agent is made from one or more monomer the polymerization of which can be initiated by free radicals, the monomer containing one or more carboxyl groups.

8. The polymeric coating agent of claim 1, further comprising at least one cross-linking agent, a lacquer additive, and optionally a pigment and/or a filler.

9. The polymeric coating agent of claim 8, further comprising a lacquer solvent.

10. The polymeric coating agent of claim 8, wheren the coating agent is an aqueous coating agent which optionally further comprises one or more organic solvents.

11. The polymeric coating agent of claim 1, wherein the agent has a hydroxy- and/or carboxy function, the composition further comprising a cross-linking agent that is an optionally masked polyisocyanate and/or masked melamine resin, or one or more polyepoxide.

12. The polymeric coating agent of claim 1, wherein the agent has an epoxy-and an optional hydroxy functionality the composition further comprises an optionally carboxy functional cross-linking agent, and optionally one or more melamine resins, or optionally one or more optinally masked polyamines.

13. The polymeric coating agent of claim 1, wherein the agent has an epoxy acryloyl functionality, the composition further comprises as cross-linking agents one or more optionally masked polyamines, one or more compounds containing CH-acid groups in the molecule, or one or more compounds containing transesterifiable groups in the molecule.

* * * * *